United States Patent
Resterhouse (10) Patent No.: US 6,810,636 B2
(45) Date of Patent: Nov. 2, 2004

(54) CONTAINER AND SPOUT ASSEMBLY APPARATUS AND METHOD OF ASSEMBLY

(75) Inventor: Michael R. Resterhouse, Muskegon, MI (US)

(73) Assignee: Fogg Filler Company, Holland, MI (US)

( * ) Notice: Subject to any disclaimer, the term of this patent is extended or adjusted under 35 U.S.C. 154(b) by 325 days.

(21) Appl. No.: 10/260,009

(22) Filed: Jan. 29, 2002

(65) Prior Publication Data

US 2003/0216235 A1 Nov. 20, 2003

Related U.S. Application Data

(60) Provisional application No. 60/265,134, filed on Jan. 30, 2001.

(51) Int. Cl.[7] .................................................. B65B 7/28
(52) U.S. Cl. .................... 53/133.2; 53/133.1; 53/284.7; 53/308; 53/313; 493/210; 493/213
(58) Field of Search ............................. 53/133.1, 133.2, 53/284, 284.7, 287, 300, 308, 313, 410; 493/210, 213

(56) References Cited

U.S. PATENT DOCUMENTS

| | | | | |
|---|---|---|---|---|
| 3,673,663 A | * | 7/1972 | Taddei .......................... 29/798 |
| 3,862,486 A | * | 1/1975 | McArdle ...................... 29/413 |
| 3,948,711 A | * | 4/1976 | Piatek .......................... 156/215 |
| 4,695,337 A | * | 9/1987 | Christine ...................... 156/69 |
| 4,736,572 A | * | 4/1988 | Fang et al. .................... 53/512 |
| 4,981,463 A | * | 1/1991 | Susini et al. ................. 493/380 |
| 5,348,525 A | * | 9/1994 | Buchanan ..................... 493/213 |
| 5,484,375 A | * | 1/1996 | Owensby et al. ........... 493/190 |
| 5,855,544 A | * | 1/1999 | Buchanan ..................... 493/102 |
| 6,178,724 B1 | * | 1/2001 | Tobolka ........................ 53/451 |
| 6,668,517 B2 | * | 12/2003 | Hiramoto et al. .......... 53/133.2 |

* cited by examiner

Primary Examiner—Scott A. Smith
(74) Attorney, Agent, or Firm—King & Jovanovic, PLC (57) ABSTRACT

A container and spout assembly apparatus for assembling a plurality of flexible containers with corresponding spouts. The container and spout assembly apparatus comprises a plurality of assembly stations, a container introduction station, a spout introduction station and a container removal station. Each of the plurality of assembly stations is substantially rotatably positioned about a general axis of rotation. In addition, each of the plurality of assembly stations includes a container manipulating assembly, a spout grasping and positioning member and a joining assembly. The container manipulating member is capable of retaining and manipulating a flexible container. The spout grasping and positioning member is capable of relatively positioning a spout in a desired position relative to a flexible container upon at least one of manipulation and retention thereof by the container manipulating assembly. The joining assembly is capable of joining a container and spout positioned into a desired position relative to a flexible container by the spout grasping and positioning member. The container introduction station is capable of sequentially introducing containers to respective container manipulating assemblies of the plurality of assembly stations. The spout introduction station is capable of sequentially introducing spouts to respective spout grasping and positioning members of the plurality of assembly stations. The container removal station is capable of removing an assembled container and spout from each of the plurality of assembly stations.

36 Claims, 7 Drawing Sheets

CONTAINER AND SPOUT ASSEMBLY APPARATUS AND METHOD OF ASSEMBLY

CROSS-REFERENCE TO RELATED APPLICATION(S)

This application is a continuation-in-part of now abandoned U.S. application Ser. No. 60/265,134, filed Jan. 30, 2001, which is hereby incorporated herein by reference in its entirety.

BACKGROUND OF THE INVENTION

1. Field of the Invention

The present invention is directed primarily to a container assembly apparatus, and more particularly to a container and spout assembly apparatus and method for assembling a container and spout.

2. Background Art

The use of flexible type containers having rigid spouts has become common for both industrial and consumer goods. Generally, the manufacture of the container requires the heat welding of a flexible container with a rigid spout. While such containers have become very popular, the manufacture of such containers has been problematic. For example, the conventional linear system of assembly has not produced containers at an acceptable rate, which can keep up with a conventional filler machine. Thus, it is difficult to synchronize fill machines and container manufacturing machines into a single continuous process. Moreover, the relatively slow rate of manufacturing raises the overall unit cost of a container.

The object of the present invention is to overcome the shortcomings of the above-described prior devices.

Other objects of the invention will become apparent in light of the specification and claims attached hereto.

SUMMARY OF THE INVENTION

The invention comprises a container and spout assembly apparatus for assembling a plurality of flexible containers with corresponding spouts. The apparatus includes a plurality of assembly stations, a container introduction station, a spout introduction station, and a container removal station. Each of the plurality of assembly stations is substantially rotatably positioned about a general axis of rotation, and, each of the plurality of assembly stations includes a container manipulating assembly, a spout grasping and positioning member, and a joining assembly. The container manipulating assembly is capable of retaining and manipulating a flexible container. The spout grasping and positioning member is capable of relatively positioning a spout in a desired position relative to a flexible container upon at least one of manipulation and retention thereof by the container manipulating assembly. The joining assembly is capable of joining a flexible container and a spout positioned into a desired position relative to the flexible container by the spout grasping and positioning member. The container introduction station is capable of sequentially introducing containers to respective container manipulating assemblies of the plurality of assembly stations. The spout introduction station is capable of sequentially introducing spouts to respective spout grasping and positioning members of the plurality of assembly stations. The container removal station is capable of removing an assembled container and spout from each of the plurality of assembly stations.

In a preferred embodiment of the invention the container manipulating assembly comprises a first gripper member and a second gripper member. The first gripper member is capable of releasably retaining a wall of a flexible container. The second gripper member is capable of releasably retaining a wall of a flexible container other than a wall associated with a first gripper member. The relative movement of at least one of the first gripper member and the second gripper member, in turn, manipulates at least one wall of a container so as to open at least a portion thereof.

In one such preferred embodiment of the invention, at least one of the first and second gripper members are rotatably positionable into a desired engaged orientation. In another such preferred embodiment, the first and second gripper members are each positioned on an opposite side of a container. Preferably, at least one of the first and second gripper members operate pneumatically.

In another preferred embodiment of the invention, the spout grasping and positioning member comprises a first arm and a second arm. At least one of the first and second arms is movable relative to the other of the first and second arms, to, in turn, facilitate the retention of a spout therebetween.

In one preferred embodiment of the invention, the joining assembly comprises a first and a second joining member, each having a joining element. At least one of the first and second joining members is movable relative to the other of the first and second joining members to, in turn, facilitate the grasping of at least a portion of a container and at least a portion of a spout therebetween. Activation of the joining elements of each of the first and second joining members serves to join the container to the spout in a substantially fluid tight configuration.

In one such preferred embodiment of the invention, at least one of the first and second joining members is rotatably positionable from a first disengaged position to a second engaged position. In another such preferred embodiment, each of the first and second joining members are rotatably positionable from a first disengaged position to a second engaged position. In one embodiment, the first and second joining members rotate about a single axis of rotation.

In another such embodiment of the invention, at least one of the first and second joining members is slidably positionable from a first disengaged position to a second engaged position.

In another such preferred embodiment of the invention, the joining elements of the joining assembly comprise heating elements. In other embodiments, the joining elements of the joining assembly comprise one selected from the group consisting of: ultrasonic welding elements, adhesive applicators and activators.

In a preferred embodiment of the invention, the container introduction station further comprises a moving arm capable of rotating about an axis and at least one gripper element associated with the moving arm.

In another preferred embodiment of the invention, the spout introduction station further comprises a supply container and an outlet associated with the supply container.

In yet another preferred embodiment of the invention, the container removal station further comprises at least one gripper member capable of gripping a portion of an assembled container.

In another aspect of the invention, the invention comprises a rotating assembly station for the assembling of a flexible container and a spout. In such an embodiment, the assembly station comprises a container manipulating assembly capable of retaining and manipulating a flexible container, a spout grasping and positioning member capable of relatively positioning a spout in a desired position relative to a flexible container upon at least one of manipulation and retention thereof by the container manipulating assembly, and, a joining assembly capable of joining a spout positioned into a desired position by the spout grasping and positioning member.

The invention further comprises a method of assembling a plurality of containers with corresponding spouts. The method comprises the steps of providing a plurality of rotating assembly stations, the assembly stations rotating about a substantially common axis; sequentially introducing a flexible container to each of the plurality of rotating assembly stations; sequentially introducing a spout to each of the plurality of rotating assembly stations; opening a portion of each flexible container during rotation of the rotating assembly stations, inserting a portion of a spout into each flexible container during rotation of the rotating assembly stations; joining a portion of the respective spout with a portion of each container into a substantially water tight configuration during rotation of the rotating assembly stations; and sequentially removing the assembled container from the rotating assembly stations, wherein the introduction, joining and removal of a respective container and spout is accomplished in no more than a single rotation of a respective rotating assembly station.

In one preferred embodiment of the invention, the step of joining comprises the steps of positioning at first and second joining elements relative to each other so as to retain a portion of a container and spout therebetween, and, activating the first and second joining elements to join the retained portions of the container and spout.

In one such preferred embodiment of the invention, the step of positioning comprises the step of rotating at least one of the first and second joining elements from a first disengaged position to a second engaged position.

In another such preferred embodiment of the invention, the step of positioning comprises the step of rotating each of the first and second joining elements from a first disengaged position to a second engaged position.

In a preferred embodiment of the invention, the step of introducing a flexible container comprises the step of contacting a respective container with at least one gripper member and activating the at least one gripper member to, in turn, retain the flexible container.

In one such preferred embodiment, the step of contacting comprises the step of contacting a respective container with at least one gripper member on a first container wall and contacting a respective container with at least one gripper member on a container wall other than the first container wall.

In one such preferred embodiment, one of the steps of contacting further comprises rotatably positioning at least one gripper member from a first disengaged position to a second engaged position.

BRIEF DESCRIPTION OF THE DRAWINGS

The invention will now be described with reference to the drawings wherein.

DETAILED DESCRIPTION OF THE INVENTION

While this invention is susceptible of embodiment in many different forms, there is shown in the drawings and will be described in detail, two specific embodiments with the understanding that the present disclosure is to be considered as an exemplification of the principles of the invention and is not intended to limit the invention to the embodiments illustrated.

Figure 1:
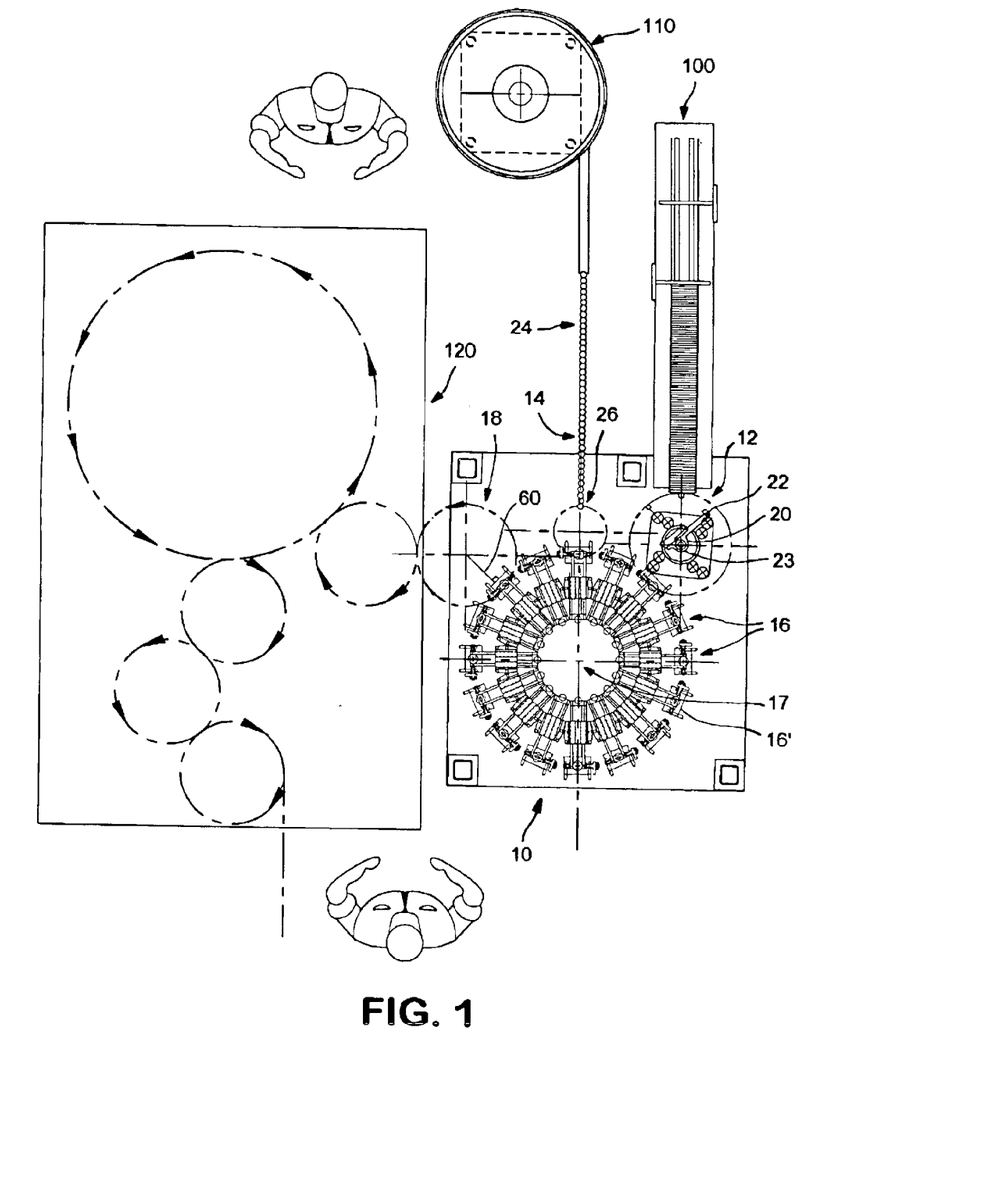
FIG. 1 of the drawings is a top schematic view of the apparatus of the present invention in conjunction with material feed devices and fill devices.

Referring now to the Figures, and in particular FIG. 1, container and spout assembly apparatus is shown generally at 10. While apparatus 10 may be intended for use as a stand-alone device, apparatus 10 is generally intended for use in association with container feed device 100, spout feed device 110 and fill device 120. The material feed devices and the fill devices are not limited to any particular device and/or type of device from any particular manufacturer. Indeed, the apparatus of the present invention can be modified to operate in association with various different types of these devices without departing from the scope of the invention.

Additionally, the containers which are contemplated for assembly comprise containers which generally comprise a foil or other flexible material in combination with a spout which is generally of equal or greater rigidity than the container. Generally, such a container includes a plurality of container walls, which container can be substantially flattened prior to assembly, and which can be expanded by moving the respective container walls relative to each other. Increasingly, such containers are being utilized for consumer products including but not limited to detergents, cleaning fluids, refreshments, condiments, etc. Of course, the system is not limited to use in association with any particular size or configuration of container.

Figure 2:
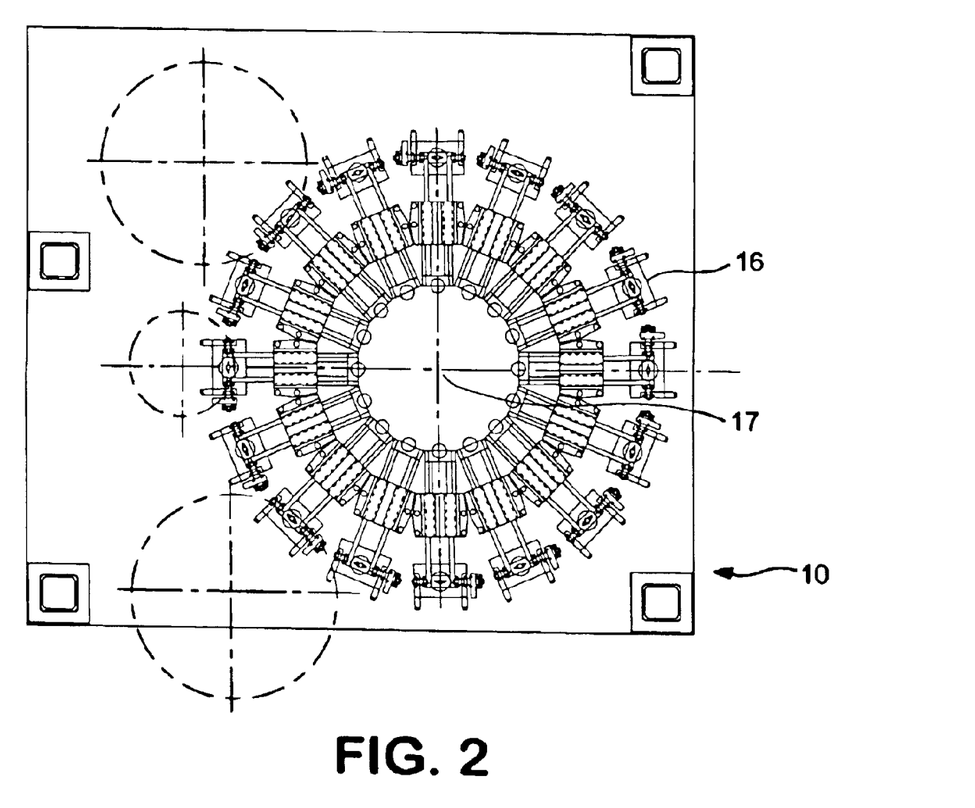
FIG. 2 of the drawings is a top schematic view of the apparatus of the present invention.
Figure 3:
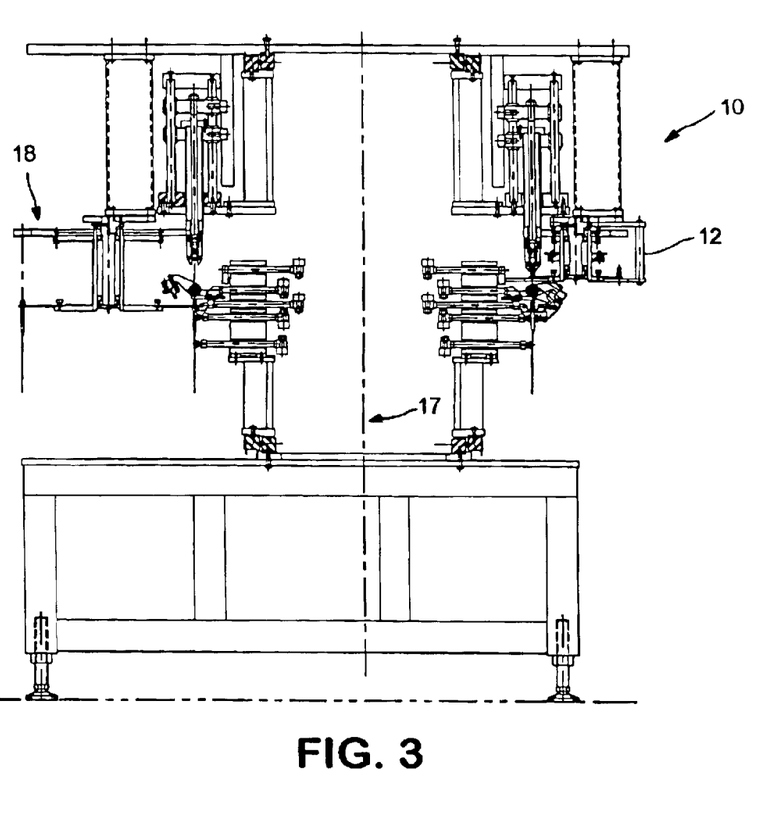
FIG. 3 of the drawings is a side schematic view of the apparatus of the present invention.
Figure 4:
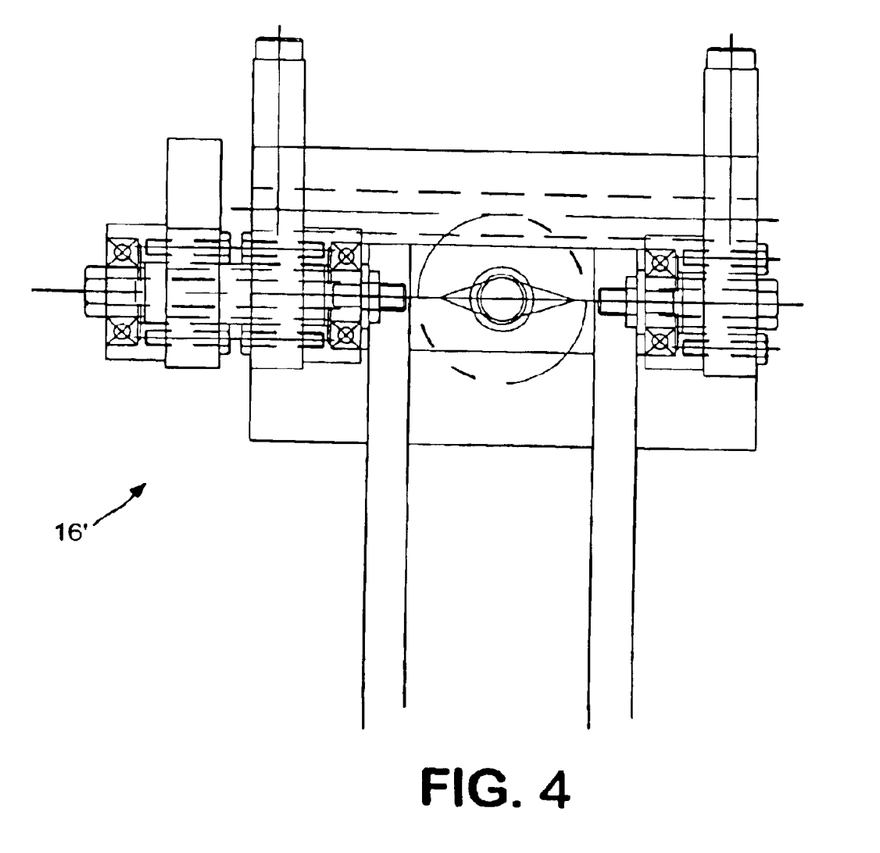
FIG. 4 of the drawings is a top schematic view of one embodiment of the assembly station.

As shown in more detail in FIGS. 1–3, apparatus 10 includes container introduction station 12, spout introduction station 14, a plurality of assembly stations, such as station 16, which are positioned so as to rotate in unison about axis 17, and container removal station 18. While the apparatus is shown as including fifteen assembly stations, it is contemplated that a greater or fewer number of stations are contemplated for use. As will be explained in detail below with respect to the manufacturing process, the container and spout are introduced and then assembled as the assembly station rotates about axis 17.

Referring now to FIG. 1, container introduction station 12 includes moving arm 20 which includes gripper element 22. Moving arm 20 rotates about axis 23 from a first position proximate the container feed device 100 to a second position proximate one of the assembly stations. In one embodiment gripper element 22 comprises a vacuum system which grasps the container by way of applying a vacuum/suction to the outside surface of the container. Once the vacuum is applied, the arm rotates to the second position. Once in the second position, the vacuum is released to disengage the container from this gripper element.

Spout introduction station 14 includes supply container 24 and outlet 26. As will be understood, supply container 24 comprises a container which is capable of receiving a plurality of spouts for distribution to the system. Outlet 26 includes a means for aligning the exiting supply containers in a particular orientation so that the individual spouts can be transferred from the outlet to the assembly stations. Various different methods are contemplated for use to facilitate the receipt of the spout in a desired orientation.

With respect to the assembly stations, it will be understood that the plurality of assembly stations are substantially identical, and, as such, assembly station 16' (of FIG. 1) will be explained in detail with the understanding that the remaining assembly stations include substantially the same components.

Figure 5:
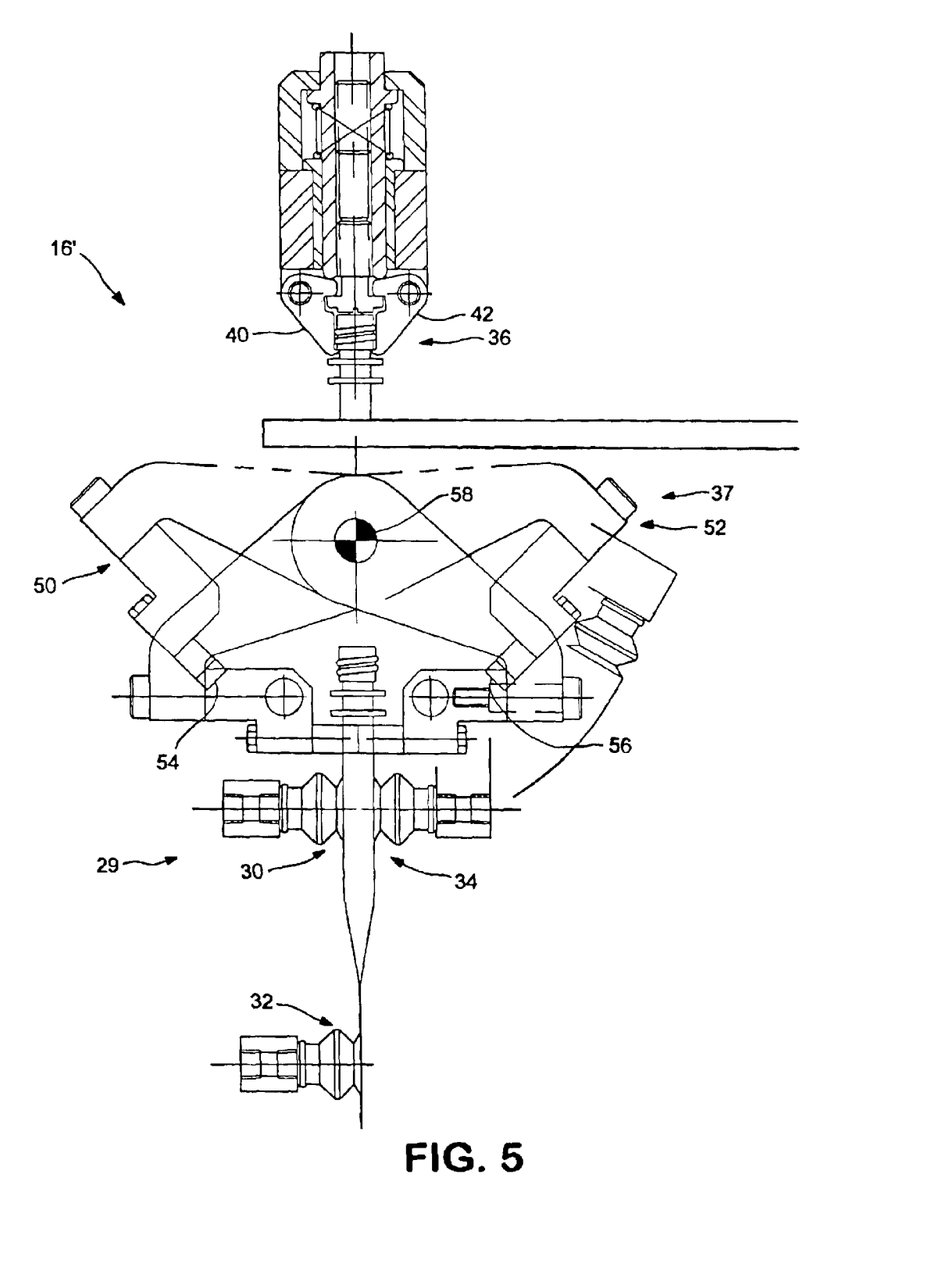
FIG. 5 of the drawings is a side schematic view of the embodiment of FIG. 4.

Referring now to FIG. 5, assembly station 16' includes container manipulating assembly 29, spout grasping and positioning member 36 and joining assembly 37. Container manipulating assembly 29 includes gripper members 30, 32 and 34 which comprise pneumatic vacuum/suction members which are capable of grasping and retaining the respective surfaces of the container under a vacuum applied thereto. In particular, gripper members 30 and 32 are positioned on a first side of the container and cooperate to grab and retain the first side of the container. Gripper member 34 is positioned on the opposite side of the container so as to grab and retain the second (and in the embodiment shown) opposing side of the container relative to gripper members 30, 32. In this particular embodiment, gripper member 34 can be moved away from the container when not required which facilitates the introduction and removal of the container from the assembly station. In the embodiment shown, gripper member 34 is rotated from a first disengaged position to a second engaged position in a plane which is substantially perpendicular to the container side. Of course, rotation or pivoting in other planes, as well as other types of movement (translation, sliding, etc.), are likewise contemplated to selectively move selected container manipulating members to and from engaged and disengaged positions. Of course, the positioning of the gripper members can be varied depending on the size, orientation and configuration of the container which is to be associated with a spout, and depending of the relative positioning of the spout vis-á-vis the container.

As will be explained in more detail with respect to the operation, after engagement of the container manipulating assembly, relative movement of gripper members 30 and 34 facilitates the opening of a portion of the container so as to permit the insertion of the spout. In such an embodiment, either one or both of gripper members 30, 34 can be moved while gripper member 32 maintains the stability of the container. In other embodiments, the retaining and the manipulating functions can be performed by two different systems or different subassemblies without departing from the scope of the present invention. In yet other embodiments, the gripper members 30, 32 can remain relatively stationary and the spout can be configured such that the spout expands the container upon movement of the spout into the desired orientation.

As shown in FIG. 5, spout grasping and positioning member 36 includes arms 40 and 42 which cooperate to grasp the spout from outlet 26 of spout introduction station 14, and, in turn, to retain the spout in the desired orientation. The spout grasping and positioning member is likewise capable of positioning the spout relative to the container so that it can be inserted into the container upon the manipulation of the container by gripper members 30, 32 and 34 into an open and receiving position. Again, various members are contemplated for use which are capable of retaining and repositioning the spout.

Figure 6:
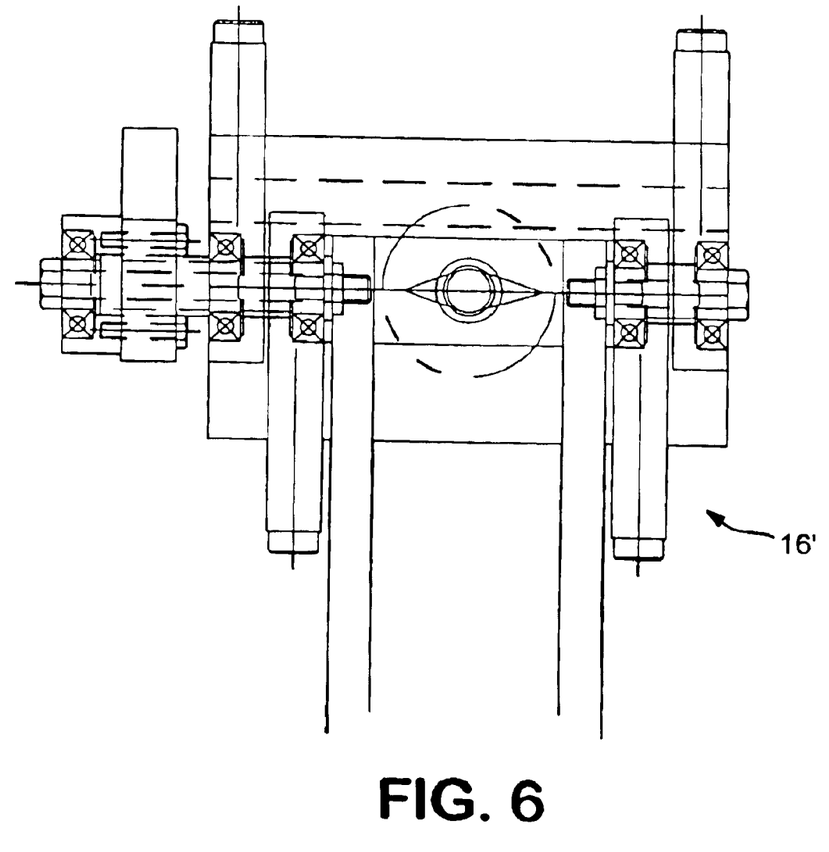
FIG. 6 of the drawings is a top schematic view of a second embodiment of the assembly station.
Figure 7:
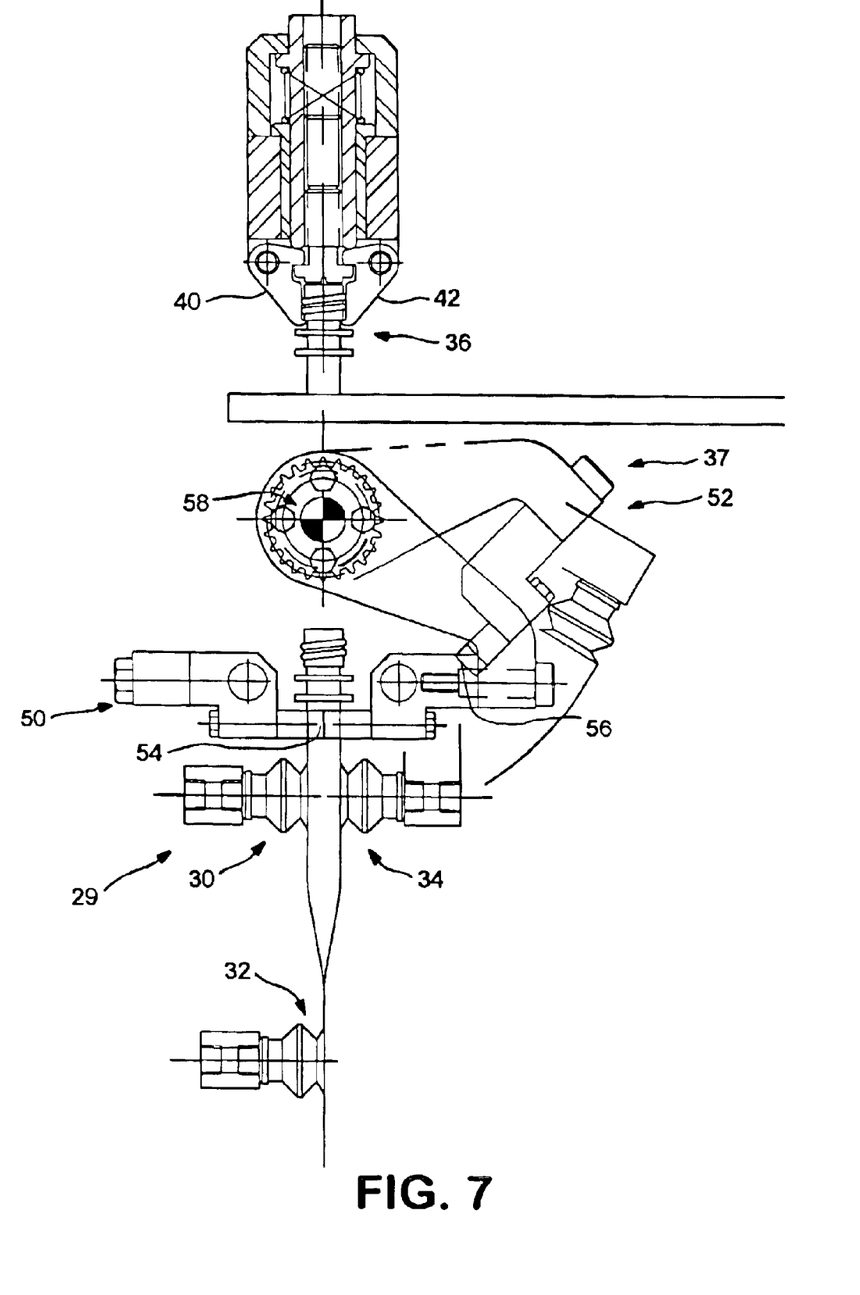
FIG. 7 of the drawings is a side schematic view of the embodiment of FIG. 6.

Referring again to FIG. 5, joining assembly 37 comprises joining arms 50, 52 each of which includes joining elements 54, 56, respectively. As will be understood, joining arms 50, 52 are configured so as to rotate about axis 58 from a first disengaged position wherein the heating elements are positioned away from each other, to a second engaged position wherein the heating elements are positioned proximate to each other (and capable of retaining the container and spout therebetween). While the joining arms are shown as being rotatable about a common axis, it is contemplated that in other embodiments, the joining arms may rotate about separate axis of rotation. In another embodiment, as shown in FIGS. 6 and 7, at least one of the joining arms is transversely slidable or, in the alternative, substantially fixed in an engaged position. In either embodiment, the joining arms are positioned into a fully engaged position upon which the joining elements can be activated. Of course, it will be understood that in certain embodiments the joining elements may comprise heating elements which heat and, in turn, melt/fuse the container and spout together. In other embodiment, the joining elements may comprise ultrasonic welding elements, adhesive applicators and activators, among others.

Referring now to FIG. 1, container removal station 18 comprises a plurality of gripping members such as gripping member 60 which likewise operates on a vacuum system (although other embodiments are contemplated for use). Indeed, the gripper element may be positioned on a rotating member such that the gripper element is capable of attaching to the completed container, to transfer the container from the assembly station to a fill device, for eventual filling.

In operation, a plurality of containers are associated with container feed device 100 and a plurality of spouts are associated with the spout feed device 110. Once provided, container and spout assembly apparatus 10 is activated. In particular, containers are grasped by the gripper element 22 of moving arm 20. The moving arm then rotates to a second position proximate the rotating assembly stations 16 wherein the container contacts gripper members 30 and 32 of the respective assembly station. These gripper members 30, 32 are then activated and the gripper element 22 is released. Once gripper element 22 is released, moving arm 20 of container introduction station 12 rotates back to the first position to grip the next container and to repeat the introduction process.

At about the same time, spout grasping and positioning member 36, and in particular arms 40 and 42, engage a spout from outlet 26 of spout introduction station 14. The spout is then moved to a position wherein it can be interfaced with the container for eventual joining.

Next, gripper member 34 rotates into a container engaging position and is activated to grip the container on a side which is substantially opposite that of gripper 30. Of course, the particular orientation and positioning of the gripper members relative to each other is not limited to any particular position, and various positions are contemplated which ultimately facilitate the manipulation of the container into the desired orientations. Once gripper member 34 is placed into an engaged position, gripper members 30 and 34 move relative to each other so as to open a portion of the container.

Once the container is opened, the spout grasping and positioning element is urged into a position wherein the spout is within the opening of the container. Once the spout is in the desired position relative to the container, joining assembly 37 is activated. In particular, joining members 50, 52 rotate about axis 58 so as to engage (and indeed pinch) the spout between the container walls and the joining members 50, 52. Of course, various movement of joining members 50, 52 is contemplated, depending on the particular orientation and the particular modes of movement of the joining members.

Regardless of the mode of movement of the joining members, once the joining members are properly engaging the spout and the container as desired, heating elements 54, 56 are activated and the container and spout are melted together to, in turn, seal the container, and to integrate the container and the spout into a substantially fluid tight configuration. Once the joining step is accomplished, the heating elements 54, 56 are deactivated, joining members 50, 52 can be returned to a first, disengaged position, and arms 40, 42 of spout grasping and positioning member 36 can he disengaged from the spout (which is low integrated with the container). Also, gripper member 34 is rotated to a disengaged position. It will be understood that since the spout and the container are integrated, the gripper members 30 and 32 can facilitate retention thereof within the respective assembly station.

Subsequently, gripper member 60 of container removal station 18 contacts the container and is activated so as to grip the container. At the same time, gripper members 30, 32 are deactivated and, as such, the container is transferred from the respective assembly station to removal station 18. As such, a container is received by an assembly station, assembled and removed from the assembly station in no more than one full 360° rotation.

The foregoing steps proceed as the assembly stations rotate about axis 17. As such, the process is substantially continuous as successive assembly stations rotate and begin the assembly process. In the prior art such an assembly is generally achieved in a lock step or linear fashion. Thus, the present invention increases the overall speed at which the containers are fabricated, as the rotating assembly stations facilitate greater assembly speed. Specifically, as one container is being completed at one assembly station, and is about to be removed at the removal station, other containers are associated with the other assembly stations and they are in various stages of assembly. Thus, the overall assembly rate is often magnitudes of order faster than that of a linear assembly system, or a system which operates in locked steps.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A container and spout assembly apparatus for assembling a plurality of flexible containers with corresponding spouts, the apparatus comprising:

a plurality of assembly stations substantially rotatably positioned about a general axis of rotation, each of the plurality of assembly stations including, a container manipulating assembly for retaining and manipulating one of a plurality of flexible containers;

a spout grasping and positioning member for relatively positioning one of a plurality of spouts in a desired position relative to one of a plurality of flexible containers upon at least one of manipulation and retention thereof by the container manipulating assembly; and a joining assembly for joining one of a plurality of flexible containers and one of a plurality of spouts positioned into a desired position relative to the flexible container by the spout grasping and positioning member;

a container introduction station, for sequentially introducing each one of a plurality of flexible containers to the respective container manipulating assembly of the plurality of assembly stations;

a spout introduction station, for sequentially introducing each one of a plurality of spouts to the respective spout grasping and positioning member of the plurality of assembly stations; and a container removal station, for removing each one of a plurality of flexible containers and spouts from each of the plurality of assembly stations after joining of same by the joining assembly.

2. The container and spout assembly apparatus of claim 1 wherein the container manipulating assembly comprises:

a first gripper member for releasably retaining a wall of one of a plurality of flexible containers;

a second gripper member capable of releasably retaining a wall of one of a plurality of flexible containers other than a wall associated with a first gripper member;

wherein relative movement of at least one of the first gripper member and the second gripper member, in turn, manipulates at least one wall of one of a plurality of flexible containers so as to open at least a portion thereof.

3. The container and spout assembly apparatus of claim 2 wherein at least one of the first and second gripper members are rotatably positionable into a desired engaged orientation.

4. The container and spout assembly apparatus of claim 2 wherein the first and second gripper members are each positioned on an opposite side of a container.

5. The container and spout assembly apparatus of claim 2 wherein at least one of the first and second gripper members operate pneumatically.

6. The container and spout assembly apparatus of claim 1 wherein the spout grasping and positioning member comprises:

a first arm; and a second arm;

at least one of the first and second arms being movable relative to the other of the first and second arms, to, in turn, facilitate the retention of a spout therebetween.

7. The container and spout assembly apparatus of claim 1 wherein the joining assembly comprises:

a first joining member having a joining element;

a second joining member having a joining element;

at least one of the first and second joining members being movable relative to the other of the first and second joining members to, in turn, facilitate the grasping of at least a portion of one of a plurality of flexible containers and at least a portion of one of a plurality of spouts therebetween, whereupon activation of the joining elements of each of the first and second joining members serves to join one of a plurality of flexible containers to one of a plurality of spouts in a substantially fluid tight configuration.

8. The container and spout assembly apparatus of claim 7 wherein:

at least one of the first and second joining members is rotatably positionable from a first disengaged position to a second engaged position.

9. The container and spout assembly apparatus station of claim 7 wherein:
each of the first and second joining members are rotatably positionable from a first disengaged position to a second engaged position.

10. The container and spout assembly apparatus of claim 9 wherein the first and second joining members rotate about a single axis of rotation.

11. The container and spout assembly apparatus of claim 7 wherein at least one of the first and second joining members are slidably positionable from a first disengaged position to a second engaged position.

12. The container and spout assembly apparatus of claim 7 wherein the joining elements of the joining assembly comprise heating elements.

13. The container and spout assembly apparatus of claim 7 wherein the joining elements of the joining assembly comprise one selected from the group consisting of: ultrasonic welding elements, adhesive applicators and activators.

14. The container and spout assembly apparatus of claim 1 wherein the container introduction station further comprises:
a moving arm capable of rotating about an axis; and
at least one gripper element associated with the moving arm.

15. The container and spout assembly apparatus of claim 1 wherein the spout introduction station further comprises:
a supply container; and
an outlet associated with the supply container.

16. The container and spout assembly apparatus of claim 1 wherein the container removal station further comprises at least one gripper member capable of gripping a portion of an assembled container.

17. A rotating assembly station for the assembling of a flexible container and a spout, the assembly station comprising:
a container manipulating assembly for retaining and manipulating a flexible container;
a spout grasping and positioning member for relatively positioning a spout in a desired position relative to a flexible container upon at least one of manipulation and retention thereof by the container manipulating assembly; and
a joining assembly for joining a flexible container to a spout positioned into a desired position by the spout grasping and positioning member.

18. The rotating assembly station of claim 17 wherein the container manipulating assembly comprises:
a first gripper member for releasably retaining a wall of a flexible container;
a second gripper member for releasably retaining a wall of a flexible container other than a wall associated with a first gripper member;
wherein relative movement of at least one of the first gripper member and the second gripper member, in turn, manipulates at least one wall of a flexible container so as to open at least a portion thereof.

19. The rotating assembly station of claim 18 wherein at least one of the first and second gripper members are rotatably positionable into a desired engaged orientation.

20. The rotating assembly station of claim 18 wherein the first and second gripper members are each positioned on an opposite side of a flexible container.

21. The rotating assembly station of claim 18 wherein at least one of the first and second gripper members operate pneumatically.

22. The rotating assembly station of claim 17 wherein the spout grasping and positioning member comprises:
a first arm; and
a second arm;
at least one of the first and second arms being movable relative to the other of the first and second arms, to, in turn, facilitate the retention of a spout therebetween.

23. The assembly station of claim 17 wherein the joining assembly comprises:
a first joining member having a joining element;
a second joining member having a joining element;
at least one of the first and second joining members being movable relative to the other of the first and second joining members to, in turn, facilitate the grasping of at least a portion of a flexible container and at least a portion of a spout therebetween, whereupon activation of the joining elements of each of the first and second joining members serves to join a flexible container to a spout in a substantially fluid tight configuration.

24. The rotating assembly of claim 23 wherein:
at least one of the first and second joining members is rotatably positionable from a first disengaged position to a second engaged position.

25. The rotating assembly station of claim 23 wherein:
each of the first and second joining members are rotatably positionable from a first disengaged position to a second engaged position.

26. The rotating assembly station of claim 25 wherein the first and second joining members rotate about a single axis of rotation.

27. The rotating assembly station of claim 23 wherein at least one of the first and second joining members are slidably positionable from a first disengaged position to a second engaged position.

28. The rotating assembly station of claim 23 wherein the joining elements of the joining assembly comprise heating elements.

29. The rotating assembly station of claim 23 wherein the joining elements of the joining assembly comprise one selected from the group consisting of: ultrasonic welding elements, adhesive applicators and activators.

30. A method of assembling a plurality of flexible containers with corresponding spouts, the method comprising:
providing a plurality of rotating assembly stations, the assembly stations rotating about a substantially common axis;
sequentially introducing one of a plurality of flexible containers to each of the plurality of rotating assembly stations;
sequentially introducing one of a plurality of spouts to each of the plurality of rotating assembly stations;
opening a portion of each one of a plurality of flexible containers during rotation of the rotating assembly stations;
inserting a portion of one of a plurality of spouts into each one of a plurality of flexible containers during rotation of the rotating assembly stations;
joining a portion of the respective one of a plurality of spouts with a portion of each one of a plurality of flexible containers into a substantially water tight configuration during rotation of the rotating assembly stations; and
sequentially removing the assembled container from the rotating assembly stations, wherein the introduction, joining and removal of a respective one of a plurality of flexible containers and one of a plurality of spouts is accomplished in no more than a single rotation of a respective rotating assembly station.

31. The method of claim 30 wherein the step of joining comprises the steps of:

positioning first and second joining elements relative to each other so as to retain a portion of one of a plurality of flexible containers and one of a plurality of spouts therebetween; and activating the first and second joining elements to join the retained portions of one of a plurality of flexible containers and one of a plurality of spouts.

32. The method of claim 31 wherein the step of positioning comprises the step of:

rotating at least one of the first and second joining elements from a first disengaged position to a second engaged position.

33. The method of claim 31 wherein the step of positioning comprises the step of:

rotating each of the first and second joining elements from a first disengaged position to a second engaged position.

34. The method of claim 30 wherein the step of introducing one of a plurality of flexible containers comprises the step of:

contacting a respective container with at least one gripper member; and activating the at least one gripper member to, in turn, retain one of a plurality of flexible containers.

35. The method of claim 34 wherein the step of contacting comprises the step of:

contacting a respective container with at least one gripper member on a first container wall; and contacting a respective container with at least one gripper member on a container wall other than the first container wall.

36. The method of claim 35 wherein one of the steps of contacting further comprises:

rotatably positioning at least one gripper member from a first disengaged position to a second engaged position.

* * * * *